May 15, 1934.  K. GROPENGIESSER  1,958,820
METHOD OF MANUFACTURING MARGARINE
Filed April 25, 1933
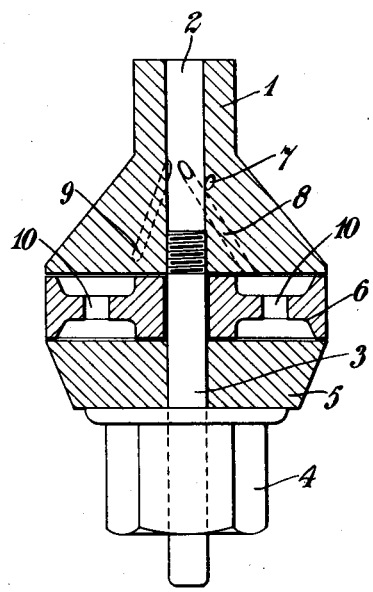
C. Gropengiesser INVENTOR
By Marks & Clerk Attys.

Patented May 15, 1934

1,958,820

UNITED STATES PATENT OFFICE 1,958,820

METHOD OF MANUFACTURING MARGARINE

Kurt Gropengiesser, Levallois-Perret, France

Application April 25, 1933, Serial No. 667,934
In Germany July 15, 1931

14 Claims. (Cl. 99—13)

Margarine is a water-in-oil emulsion; butter, according to the latest researches, is an oil-in-water emulsion.

The varying behavior between the two said types of fat during use and in the physiological aspect depends on this difference in condition.

Margarine, in which the aqueous constituents are enclosed in the form of droplets by the fat phase, shows explosive effects when melted in the frying pan, which causes the hot fat to spit out. When being made up into baked articles, margarine must be mechanically treated by the kneading apparatus to only a very slight extent since the binding between the various fats contained in the emulsion (hard fat and soft fat or oils) is only a loose one which is readily broken again. The result is a dry, crumbly dough.

Consumed margarine which has not been worked, however, presents a fatty surface to the gastric juices through which the juices can diffuse only after much delay.

Butter in every case behaves exactly the opposite since the binding of the fats is very firm owing to the albumen shell which surrounds every minute particle of fat. Since the aqueous phase has substantially larger surfaces it can escape without explosive violence even in the case of spontaneous evaporation. In this large surface of the aqueous phase is also to be seen the reason for the superior physiological suitability of butter. Scientific investigations show that the number of fat spherules in 1 gm. of butter varies between 9 and 25 milliards. In the case of margarine the corresponding quantity of fat forms a substantially cohesive mass in which the water is enclosed. In butter the water is disposed between the fat spherules in the form of spherules which according to the same calculation are present to the extent of about 8 to 16 milliards.

The problem is to make margarine in the physical state of butter since such an artificial fat would possess the technical and physiological properties of butter and would differ from the latter only in that other fats would be used instead of butter fats.

The present process offers a solution of this problem. In carrying out this process first of all a cream is made; that is to say, the fat constituent is suspended in the known and typical manner for natural cream in a liquid containing hydrophile albumen colloids. In the process provided by this invention this cream is capable of passing over into a firm mass during the buttering, i. e. under the influence of beating mechanism in the presence of air. This mass corresponds to butter as regards physical form and consequently possesses physical, technical and physiological properties which are equal to those of butter.

The physical changes of the buttering process have been satisfactorily investigated scientifically only in recent times. Whilst it has long been known that cream is to be regarded as an oil-in-water emulsion, butter, in accordance with the accepted law of phase reversal, was regarded as a water-in-oil emulsion. According to results obtained by Rahn (disclosed in "Physik der Milchwirtschaft" by Rahn and Sharp, Berlin, 1928) the butter is formed according to the so-called "froth theory", according to which the fat spherules, kept apart from one another in the aqueous phase by the surface tension (the active forces are here molecular forces), are concentrated in the froth walls of the cream, are brought very close to one another as a result, and finally adhere, the molecular forces being overcome. The albumen films enclosing the individual particles of fat are not broken by this adhesion; on the contrary, the clotting is brought about by adhesion between the albumen films, the separate position of the fat spherules being maintained.

The fat and oil constituents are supplied in the liquid form into the skim milk under the surface of the latter at about 65° C. No mechanical mixing takes place, not even under pressure. The fat spherules, on the contrary, on contacting with the hydrophile albumen colloids of the skim milk, are automatically coated with a skin immediately on entry into the liquid. The consequence is that each fat particle becomes a self-contained unit.

In all other processes, particularly when using pumps and homogenizing apparatus and mixing both phases, an enveloping of groups of fat particles already takes place within these apparatuses, that is to say a coalescence to large fat complexes takes place with production of a substance which is quite unlike butter. Since, as already mentioned, molecular forces come into play in the smallest fat particles, their behaviour in the aqueous phase is analogous to that of colloids. The molecular forces hold the separate particles apart. The albumen substances in milk, as has been found scientifically, tend to accumulate on the surface of the fat particles. The state of the electric charge of the fat particles or that of the albumen constituents may also favor the tendency of the latter to deposit on the fat particles.

It is well known that liquids can be very finely divided by means of nozzles if they are forced through the nozzles under suitable pressure. Researches carried out by the applicant have shown that such nozzles are insufficient to yield an emulsion which will not unmix, even if the pressure is very much increased. This is to be attributed to the fact that in spite of the movement arising even when using such nozzles in the emulsifying vessel the constituents issue in the form of streams so that the individual fat particles are not protected from clotting or coalescing. It is necessary, therefore, to enlarge the exit places of the constituents on the atomizing member as much as possible without substantially increasing the quantity of material issued as compared with the known processes, care being taken at the same time that the issuing fat particles are scattered directly at the exit and are removed from the atomizing member with change in direction by the violently moving aqueous phase.

A double atomizer of the type shown in the accompanying drawing has, for example, been found to be suitable for carrying out the present process. This atomizer comprises a ring member 6 running between two headpieces, an upper headpiece 1, and a lower headpiece 5. The material to be emulsified is supplied to the atomizer through the bore 2 by means of a pressure producer. The headpiece 5 is connected to the headpiece 1 by means of the shaft 3 which is screwed into the latter headpiece and locked into position by means of the nut 4. The ring 6, which has portions cut away, is rotatably mounted on the shaft 3. From the duct 2 the liquid to be emulsified passes through channels 7, 8 and 9 to the cut-away portions of the ring 6. These portions are removed from the upper and lower sides of the ring and make intercommunication through the passages 10, so that the same pressure obtains on each side of the ring 6. The channels 7, 8 and 9 are disposed in the headpiece 1 so that their inclinations to the base surface of 1 are equal; the disposition of the channels is such that the liquid forced in 2 passes down them and is guided against the ring 6 so as to cause rotation of the latter. The ring is caused to rotate with maximum rapidity by means of the pressure applied to the liquid supplied, this pressure being so high that the liquid is forced out between the ring and the headpieces over the whole periphery of the former. The high speed of rotation of the ring ensures that the smallest particles are broken up to the desired small size whilst the issuing fans of the liquid impel the aqueous part of the emulsion forward, so that vertically to this motion aqueous emulsion constituents not yet enriched with fat, or not yet enriched with fat to the point of saturation, are forthwith supplied to the vicinity of the ring. The effect can be increased if the atomizing rings are moved up and down. Other atomizing devices, producing the same effect, can also be used instead of the device described.

The emulsion made in this manner has a quality equal to that of natural cream. Even when it contains 50% of fatty constituents it is completely stable; it has the albumen constituents of the aqueous constituents of the emulsion as an outer and permeating phase whilst the oily constituents and the skim milk form the inner, that is to say the disperse phase. This emulsion is converted into a solid form by a so-called buttering process.

The particle size must not be greater than 1/1000 mm. nor smaller than 1/10000 mm. Larger particles have the property of creaming up and readily take up air as an additional component whilst being beaten up in the churn, whilst smaller particles, no longer butter up even when treated in the churn for many hours. The aqueous constituent is preferably maintained at the pasteurizing temperature, that is to say, at 65° C.

A few percent of egg-yolk are added to the skim milk, since this albumen is chemically very similar to the albumen substances in milk and in a surprising manner precipitates likewise on the fat particles. In this way it is possible to supply the same quantity by weight of fat constituents to the aqueous phase so that the resulting product has a composition of 1.1. Even such strongly super-fatted emulsions are protected from the bothersome creaming up.

The taste of the emulsion can be brought to that of butter by adding suitable fungi to the emulsion so that an acid cream is made, the flavoring constituents of which are taken up by the skim milk contained in the disperse phase and so remain in the margarine during the buttering process just as during the ordinary buttering operations.

There are no conclusive investigations showing to what extent substances are formed by lactic acid bacteria which are capable of promoting the buttering. More particularly it is not known whether the acid itself or definite albumen substances which are formed during the process play a role in the latter. It is known from Pedersen's work, however, that a strongly washed cream, that is to say, a cream which is extensively freed from lactose, loses its capability of buttering after being subjected to the action of bacteria for several days. These researches show, therefore, that the albumen skins have, by the action of bacteria, undergone a change which checks the buttering capability.

Researches by the same worker have shown that butter-fat introduced into skim milk, even with a dispersion and particle size like that of natural cream, is capable of being buttered only with difficulty and incompletely. The product obtained is not like butter but like margarine and is, therefore, not a fat-in-water emulsion but a water-in-fat emulsion.

The spreading capability of the margarine may be improved by incorporating therewith a fat of low melting point. This may be effected by emulsifying such a fat with the margarine emulsion product, e. g. by re-atomizing the latter with the fat with the aid of the atomizer described above.

It was not to be expected from the state of the art and science, that the artificial cream produced by the process according to the invention would be capable of being buttered; for if butter fat introduced into skim milk cannot be buttered then this effect must be expected to a still greater extent when other, more particularly, vegetable fats, are used.

Since in the case of aqueous constituents which are poor in lactic acid such as skim milk, the action of the bacteria leads to a checking of the buttering capability, then it was not to be supposed that a cream made by the process provided by this invention would show no impairment of the buttering capability after being treated with bacteria.

The finished product can be examined by the Brown-Richard-Taylor-method using polarized light and crossed nicols. Rahn's salt test is also suitable.

What I claim is:

1. The method of manufacturing a margarine of the oil-in-water emulsion type, which consists in introducing atomized liquid fats of particle size less than 0.001 mm. but not less than 0.0001 mm. under the surface of a turbulently agitated aqueous phase containing hydrophile albumin as protective colloid, and working up the resulting emulsion to a solid by a buttering process.

2. The method of manufacturing a margarine of the oil-in-water emulsion type, which consists in successively introducing atomized liquid fats of particle size less than 0.001 mm. but not less than 0.0001 mm. under the surface of a turbulently agitated aqueous phase containing hydrophile albumin as protective colloid, the aqueous phase and the liquid fat having approximately the same temperature, and working up the resulting emulsion to a solid by a buttering process.

3. The method of manufacturing a margarine of the oil-in-water emulsion type, which consists in introducing atomized liquid fats of particle size less than 0.001 mm. but not less than 0.0001 mm. under the surface of turbulently agitated skim milk, and working up the resulting emulsion to a solid by a buttering process.

4. The method of manufacturing a margarine of the oil-in-water emulsion type, which consists in introducing atomized liquid fats of particle size less than 0.001 mm. but not less than 0.0001 mm. under the surface of turbulently agitated skim milk, the fat and the milk each having a temperature of approximately 65° C., and working up the resulting emulsion to a solid by a buttering process.

5. The method of manufacturing a margarine of the oil-in-water emulsion type, which consists in introducing atomized liquid fats of particle size less than 0.001 mm. but not less than 0.0001 mm. under the surface of turbulently agitated skim milk to which a few percent of egg yolk have been added, and working up the resulting emulsion to a solid by a buttering process.

6. The method of manufacturing a margarine of the oil-in-water emulsion type, which consists in introducing atomized liquid fats of particle size less than 0.001 mm. but not less than 0.0001 mm. under the surface of turbulently agitated skim milk to which a few percent of egg yolk have been added, until an emulsion is obtained containing substantially equal parts by weight of oil phase and aqueous phase, and then working up the resulting emulsion to a solid by a buttering process.

7. The method of manufacturing a margarine of the oil-in-water emulsion type, which consists in introducing atomized liquid fats of particle size less than 0.001 mm. but not less than 0.0001 mm. under the surface of a turbulently agitated aqueous phase containing hydrophile albumin as protective colloid, acidifying the resulting emulsion by adding bacteria cultures, whereby a flavor approaching that of butter is conferred, and then working up the acidified emulsion to a solid by a buttering process.

8. The method of manufacturing a margarine of the oil-in-water emulsion type, which consists in introducing atomized liquid fats of particle size less than 0.001 mm. but not less than 0.0001 mm. under the surface of turbulently agitated skim milk, acidifying the resulting emulsion by adding bacteria cultures whereby a flavor approaching that of butter is conferred, and then working up the acidified emulsion to a solid by a buttering process.

9. The method of manufacturing a margarine of the oil-in-water emulsion type, which consists in introducing atomized liquid fats of particle size less than 0.001 mm. but not less than 0.0001 mm. under the surface of turbulently agitated skim milk, the fat and the milk each having a temperature of approximately 65° C., acidifying the resulting emulsion by adding bacteria cultures whereby a flavor approaching that of butter is conferred, and then working up the acidified emulsion to a solid by a buttering process.

10. The method of manufacturing a margarine of the oil-in-water emulsion type, which consists in introducing atomized liquid fats of particle size less than 0.001 mm. but not less than 0.0001 mm. under the surface of turbulently agitated skim milk to which a few percent of egg yolk have been added, acidifying the resulting emulsion by adding bacteria cultures whereby a flavor approaching that of butter is conferred, and then working up the acidified emulsion to a solid by a buttering process.

11. The method of manufacturing a margarine of the oil-in-water emulsion type, which consists in introducing atomized liquid fats of particle size less than 0.001 mm. but not less than 0.0001 mm. under the surface of turbulently agitated skim milk to which a few percent of egg yolk have been added, until an emulsion is obtained containing substantially equal parts by weight of oil phase and aqueous phase, acidifying the resulting emulsion by adding bacteria cultures whereby a flavor approaching that of butter is conferred, and then working up the acidified emulsion to a solid by a buttering process.

12. The method of manufacturing a margarine of the oil-in-water emulsion type, which consists in introducing atomized liquid fats of particle size less than 0.001 mm. but not less than 0.0001 mm. under the surface of a turbulently agitated aqueous phase containing hydrophile albumin as protective colloid, emulsifying a fat of low melting point in the emulsion obtained for improving the spreading capability of the margarine, and working up the emulsion finally obtained to a solid by a buttering process.

13. The method of manufacturing a margarine of the oil-in-water emulsion type, which consists in introducing atomized liquid fats of particle size less than 0.001 mm. but not less than 0.0001 mm. under the surface of turbulently agitated skim milk, emulsifying a fat of low melting point in the emulsion obtained for improving the spreading capability of the margarine, and working up the emulsion finally obtained to a solid by a buttering process.

14. The method of manufacturing a margarine of the oil-in-water emulsion type, which consists in introducing atomized liquid fats of particle size less than 0.001 mm. but not less than 0.0001 mm. under the surface of turbulently agitated skim milk to which a few percent of egg yolk have been added, emulsifying a fat of low melting point in the emulsion obtained for improving the spreading capability of the margarine, and working up the emulsion finally obtained to a solid by a buttering process.

KURT GROPENGIESSER.